United States Patent
Matthews et al.

(10) Patent No.: US 9,625,900 B2
(45) Date of Patent: Apr. 18, 2017

(54) SYSTEM FOR DATA SAMPLING OF CONTROL VALVES USING CONFIDENCE SCORES

(71) Applicant: General Electric Company, Schenectady, NY (US)

(72) Inventors: Brett Alexander Matthews, Albany, NY (US); Frederick Wilson Wheeler, Niskayuna, NY (US); Robert Claude Prescott, Marshfield, MA (US); Justin Shriver, Newton, MA (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 14/230,455

(22) Filed: Mar. 31, 2014

(65) Prior Publication Data

US 2015/0277427 A1    Oct. 1, 2015

(51) Int. Cl.
*G05B 23/02*    (2006.01)
*G05B 21/02*    (2006.01)
*G05B 19/418*    (2006.01)

(52) U.S. Cl.
CPC ......... *G05B 21/02* (2013.01); *G05B 19/4183* (2013.01); *G05B 23/024* (2013.01); *G05B 2219/31282* (2013.01); *G05B 2219/31455* (2013.01); *Y02P 90/10* (2015.11)

(58) Field of Classification Search
None
See application file for complete search history.

(56) References Cited

U.S. PATENT DOCUMENTS

| | | |
|---|---|---|
| 5,329,465 A | 7/1994 | Arcella et al. |
| 7,089,086 B2 | 8/2006 | Schoonover |
| 7,197,370 B1 | 3/2007 | Ryskoski |
| 2008/0004836 A1 | 1/2008 | Tewes et al. |

(Continued)

FOREIGN PATENT DOCUMENTS

| | | |
|---|---|---|
| CN | 1694025 A | 11/2005 |
| CN | 2013175864 A | 7/2013 |
| JP | 2010026576 A | 2/2010 |

OTHER PUBLICATIONS

PCT Search Report and Written Opinion issued in connection with corresponding PCT Application No. PCT/US2015/019564 on Jun. 29, 2015.

(Continued)

*Primary Examiner* — Eric C Wai
(74) *Attorney, Agent, or Firm* — Armstrong Teasdale LLP (57) ABSTRACT

A computer-implemented method for monitoring characteristic data includes selecting a first operable system device and receiving a first plurality of data from the first operable system device. The first plurality of data represents at least one characteristic of the first operable system device at a first plurality of points in time. The method also includes determining whether the first plurality of data is useful. If the data is useful, the method also includes receiving a second plurality of data from the first operable system device, the second plurality of data represents at least one characteristic of the first operable system device at a second plurality of points in time, wherein the second plurality of points in time is substantially larger than the first plurality of points in time. If the data is not useful, the method further includes selecting a second operable system device.

21 Claims, 3 Drawing Sheets

(56) References Cited

U.S. PATENT DOCUMENTS

| | | |
|---|---|---|
| 2011/0173496 A1 | 7/2011 | Hosek et al. |
| 2013/0060524 A1 | 3/2013 | Liao |
| 2013/0085717 A1 | 4/2013 | Selvaraj et al. |
| 2013/0110418 A1 | 5/2013 | Nousiainen |

OTHER PUBLICATIONS

Lindfors et al., Enhanced Maintenance Efficiency with Third-Generation Control Valve Diagnostics; Jul./Aug. 2012; www.isa.org/InTechTemplate.cfm?template=/ContentManagement/ContentDisplay.cfm&ContentID=90156; last visited Mar. 21, 2014.

Berkovich et al., On-Line Turbine Internal Efficiency Monitoring for Steam Turbine Condition Diagnostics; ASME 2006 Power Conference, Atlanta, GA, May 204, 2006.

SYSTEM FOR DATA SAMPLING OF CONTROL VALVES USING CONFIDENCE SCORES

BACKGROUND

The field of the disclosure relates generally to collecting monitored data from industrial system devices and, more particularly, to systems and methods for improving the efficiency of collecting data from multiple system devices in an industrial system.

In many industrial systems, an operable system device (e.g., a control valve) is controlled and monitored by a computer-driven plant network. The plant network, also known as a distributed control system, connects the operable system devices to at least one computer. This connection takes many forms including direct wired connections between each system device and the computer, e.g., over a bus network, or system devices wirelessly transmitting data to a computer. In many embodiments, the plant network is an interface for both sending control commands to individual system devices in the industrial system, and retrieving data from the system devices themselves.

Plant networks are used extensively in networked industrial systems as an interface for both sending control commands to individual operable system devices and extracting performance data from the operable system devices. The latter function is a critical component of the "Industrial Internet," whereby advanced analytics, including prognostic and diagnostic algorithms, are applied both locally and remotely to deployed machines in industrial settings. In some situations, e.g., when testing system devices, the system devices cannot be removed from their surroundings, and instead, the system devices need to be observed under actual operating conditions to provide good data for analysis.

However, in many plant networks the bandwidth for collecting data from operable system devices is limited. Often these systems can only collect sample data from one system device at a time and only at a low sample rate (e.g., one set of sample data every 3 seconds). Typically, the monitoring system will collect a fixed number of data samples from an individual system device, and then move on to the next system device, collecting samples from each system device in turn. Furthermore, in many practical settings, a large majority of data collected is not actually useful. When system devices are idle or inactive, for example, data collected from them may not be usable for either key performance indicators, or for making predictive and diagnostic assessments. Due to limited bandwidth, the opportunities for collecting useful data are lost when idle/inactive system devices are sampled instead.

For example in these typical monitoring systems, the monitoring system takes samples from a first system device for a fixed number of samples, e.g., about 120 or for a set period of time, e.g., about 5 minutes. At the end of that set period of time, the monitoring system selects a different operable system device and takes samples from it for a set period of time. Whether or not the data is useful for analysis purposes is not known until the data is analyzed. This is an inefficient method of data collection because a substantial period of time may be expended collecting data that is not useful.

BRIEF DESCRIPTION

In one aspect, a process monitoring system is provided. The system includes a plurality of operable system devices including a first operable system device and second operable system device. The system also includes a processing device coupled to the plurality of operable system devices. The processing device is programmed to select the first operable system device. The processing device is also programmed to receive a first plurality of data from the first operable system device. The first plurality of data represents at least one characteristic of the first operable system device at a first plurality of points in time. The processing device is further programmed to determine whether the first plurality of data is useful. If the determination is that the first plurality of data is useful, the processing device is also programmed to receive a second plurality of data from the first operable system device. The second plurality of data represents the at least one characteristic of the first operable system device at a second plurality of points in time, the second plurality of points in time is substantially larger than the first plurality of points in time. If the determination is that the first plurality of data is not useful, the processing device is further programmed to select the second operable system device.

In a further aspect, a computer-implemented method having a processing device in communication with a memory device is provided. The method includes selecting, by the processing device, a first operable system device from a plurality of operable system devices. The method also includes receiving, by the processing device, a first plurality of data from the first operable system device. The first plurality of data represents at least one characteristic of the first operable system device at a first plurality of points in time. The method further includes determining, by the processing device, whether the first plurality of data is useful. If the determination is that the first plurality of data is useful, the method also includes receiving, by the processing device, a second plurality of data from the first operable system device. The second plurality of data represents the at least one characteristic of the first operable system device at a second plurality of points in time, the second plurality of points in time is substantially larger than the first plurality of points in time. If the determination is that the first plurality of data is not useful, the method further includes selecting, by the processing device, a second operable system device from the plurality of operable system devices.

In another aspect, a computer-readable storage media for monitoring characteristic data is provided. The computer-readable storage media having computer-executable instructions embodied thereon. When executed by at least one processor, the computer-executable instructions cause the at least one processor to select a first operable system device from a plurality of operable system devices. The computer-executable instructions also cause the processor to receive a first plurality of data from the first operable system device. The first plurality of data represents at least one characteristic of the first operable system device at a first plurality of points in time. The computer-executable instructions further cause the processor to determine whether the first plurality of data is useful. If the determination is that the first plurality of data is useful, the computer-executable instructions also cause the processor to receive a second plurality of data from the first operable system device. The second plurality of data represents the at least one characteristic of the first operable system device at a second plurality of points in time, the second plurality of points in time is substantially larger than the first plurality of points in time. If the determination is that the first plurality of data is not useful, the computer-executable instructions further cause the processor to select a second operable system device from the plurality of operable system devices.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The plant network systems described herein provide efficient data collection from multiple operable system devices. The embodiments described herein use a device management (DM) computer system to receive data from one operable system device at a time. When the DM computer system attempts to obtain analysis data from operable system devices in the plant network, the DM computer system selects an operable system device, and receives a small amount of data from that device. This small amount of data represents at least one characteristic of the operable system device at multiple points in time. The DM computer system analyzes the small amount of data to determine if the operable system device will provide useful data. If not, then the DM computer system selects another device and proceeds to receive a small amount of data from the second device. If the small amount of data from the original was determined to be useful, then the DM computer system continues to receive data from the original device until it has the amount it needs for analysis data. This additional data is sampled at significantly more points of time than the small amount of data.

Figure 1:
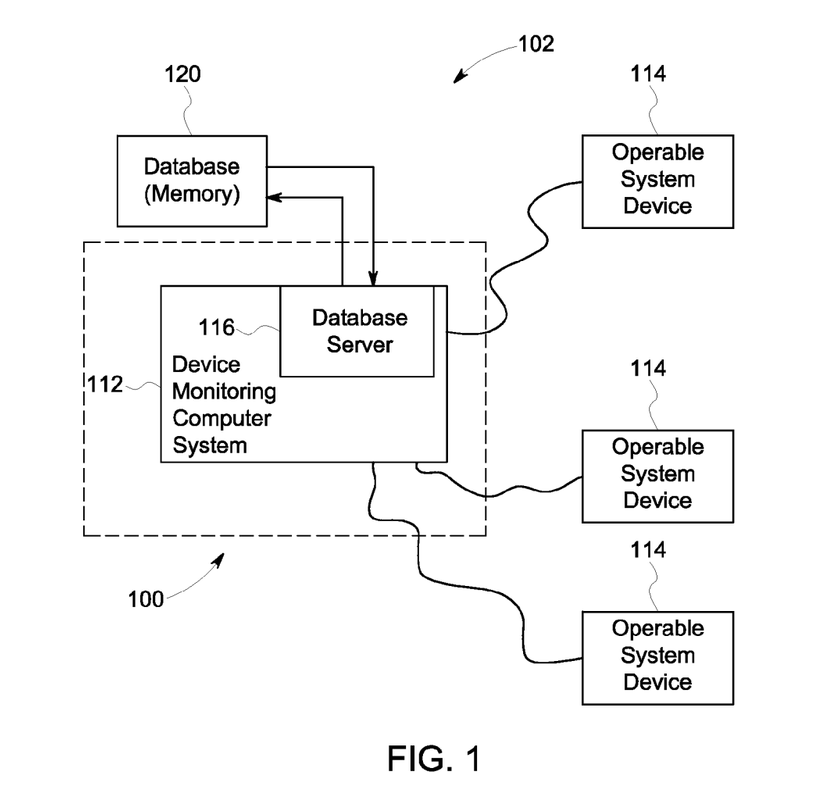
FIG. 1 is a general schematic diagram of an exemplary plant network including a device monitoring computer system in communication with a plurality of operable system devices.

FIG. 1 is a general schematic diagram of a process monitoring system 100 integrated into a plant network 102. In the exemplary embodiment, process monitoring system 100 is used for monitoring and controlling the plurality of operable system devices 114. Process monitoring system includes a device monitoring (DM) computer system 112 that is in communication with operable system devices 114. As described below in more detail, DM computer system 112 collects sample data from multiple operable system devices 114 by taking a few samples from a first operable system device 114. DM computer system 112 analyzes those samples. If the few samples are determined to indicate that continuing to collect samples from the first operable system device may provide data that is useful for future analysis, then DM computer system 112 continues to collect samples from the first operable system device. Otherwise, if the samples do not indicate potentially useful data, DM computer system 112 switches to a second operable system device.

More specifically, in the exemplary embodiment, plant network 102 includes DM computer system 112, and a plurality of operable system devices 114, connected to DM computer system 112. Operable system devices 114 are any field device connected through the DM computer system 112 through wired or wireless communication. Examples of such field devices include, but are not limited to positioners, transmitters, actuators, analytic, and analyzers. Examples of connectivity to DM computer system 112 include wireless communication for example HART and ISA 100 as well as wired through HART, Foundation Field Bus H1 and HSE. In the exemplary embodiment, operable system devices 114 are control valves in two-way communication with DM computer system 112 through wired connections, such as a bus network. DM computer system 112 controls operable system devices 114 by transmitting instructions. Operable system devices 114 transmit characteristic information to DM computer system 112 about the current characteristics of each operable system device 114. For example, the characteristic information of a control valve received by DM computer system 112 includes, but is not limited to, the set point of the valve, the actual position of the valve, and the control mechanism, e.g., without limitation, a control system inducing a control air pressure. Alternatively, the control mechanism may be a hydraulic control system inducing a hydraulic pressure or electric motor positioning system. Operable system devices 114 connect to DM computer system 112 through many interfaces including without limitation a network, such as a local area network (LAN) or a wide area network (WAN), dial-in-connections, cable modems, Internet connection, wireless, and special high-speed Integrated Services Digital Network (ISDN) lines.

In the exemplary embodiment, DM computer system 112 is configured to communicate with one operable system device 114 at a time. This is due to low-bandwidth over the connection between DM computer system 112 and the operable system devices 114. The individual connections are done using a round-robin connection scheme, where each operable system device 114 is connected to or interrogated in a predetermined order.

A database server 116 is coupled to database 120, which contains information on a variety of matters, as described below in greater detail. In one embodiment, centralized database 120 is stored on DM computer system 112. In an alternative embodiment, database 120 is stored remotely from server system 112 and may be non-centralized. Database 120 can include a single database having separated sections or partitions or may include multiple databases, each being separate from each other. Database 120 stores sample data received from multiple operable system devices 114. In addition, database 120 may store analyzed data, confidence scores, and historical data generated as part of collecting sample data from multiple operable system devices 114. The sample data that database 120 stores may include at least one of a set point, current position, and control mechanism.

Figure 2:
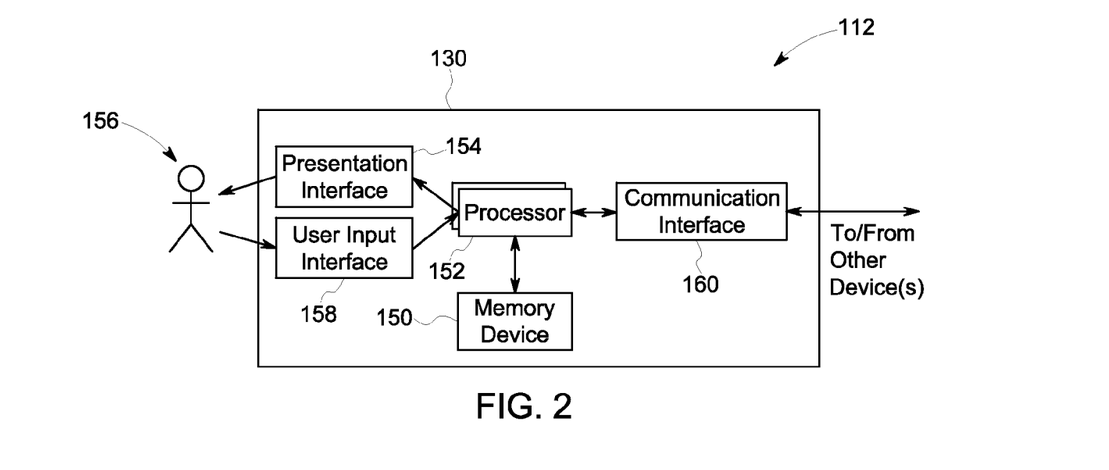
FIG. 2 illustrates an exemplary configuration of the device management computer system shown in FIG. 1.

FIG. 2 illustrates an exemplary configuration of the DM computer system 112 shown in FIG. 1. More specifically, computing device 130 monitors and/or controls any operable system device 114 (shown in FIG. 1). Computing device 130 includes a memory device 150 and a processor 152, also known as a processing device, operatively coupled to memory device 150 for executing instructions. In some embodiments, executable instructions are stored in memory device 150. Computing device 130 is configurable to perform one or more operations described herein by programming processor 152. For example, processor 152 may be programmed by encoding an operation as one or more executable instructions and providing the executable instructions in memory device 150. In the exemplary embodiment, memory device 150 is one or more devices that enable storage and retrieval of information such as executable instructions and/or other data. Memory device 150 may include one or more computer readable media.

Memory device 150 may be configured to store operational measurements including, without limitation, real-time and historical voltage and current values, and/or any other type data. Also, memory device 150 includes, without limitation, sufficient data, algorithms, and commands to facilitate monitoring and control of the operable system devices 114 within plant network 102.

In some embodiments, computing device 130 includes a presentation interface 154 coupled to processor 152. Presentation interface 154 presents information, such as a user interface and/or an alarm, to a user 156. In some embodiments, presentation interface 154 includes one or more display devices. In some embodiments, presentation interface 154 presents sample data associated with an operable system device, such as by using a human machine interface (HMI) (not shown in FIG. 1). Also, in some embodiments, computing device 130 includes a user input interface 158. In the exemplary embodiment, user input interface 158 is coupled to processor 152 and receives input from user 156.

A communication interface 160 is coupled to processor 152 and is configured to be coupled in communication with one or more other devices, such as a sensor or another computing device 130, and to perform input and output operations with respect to such devices while performing as an input channel. Communication interface 160 may receive data from and/or transmit data to one or more remote devices. For example, a communication interface 160 of one computing device 130 may transmit sample data to the communication interface 160 of another computing device 130.

Figure 3:
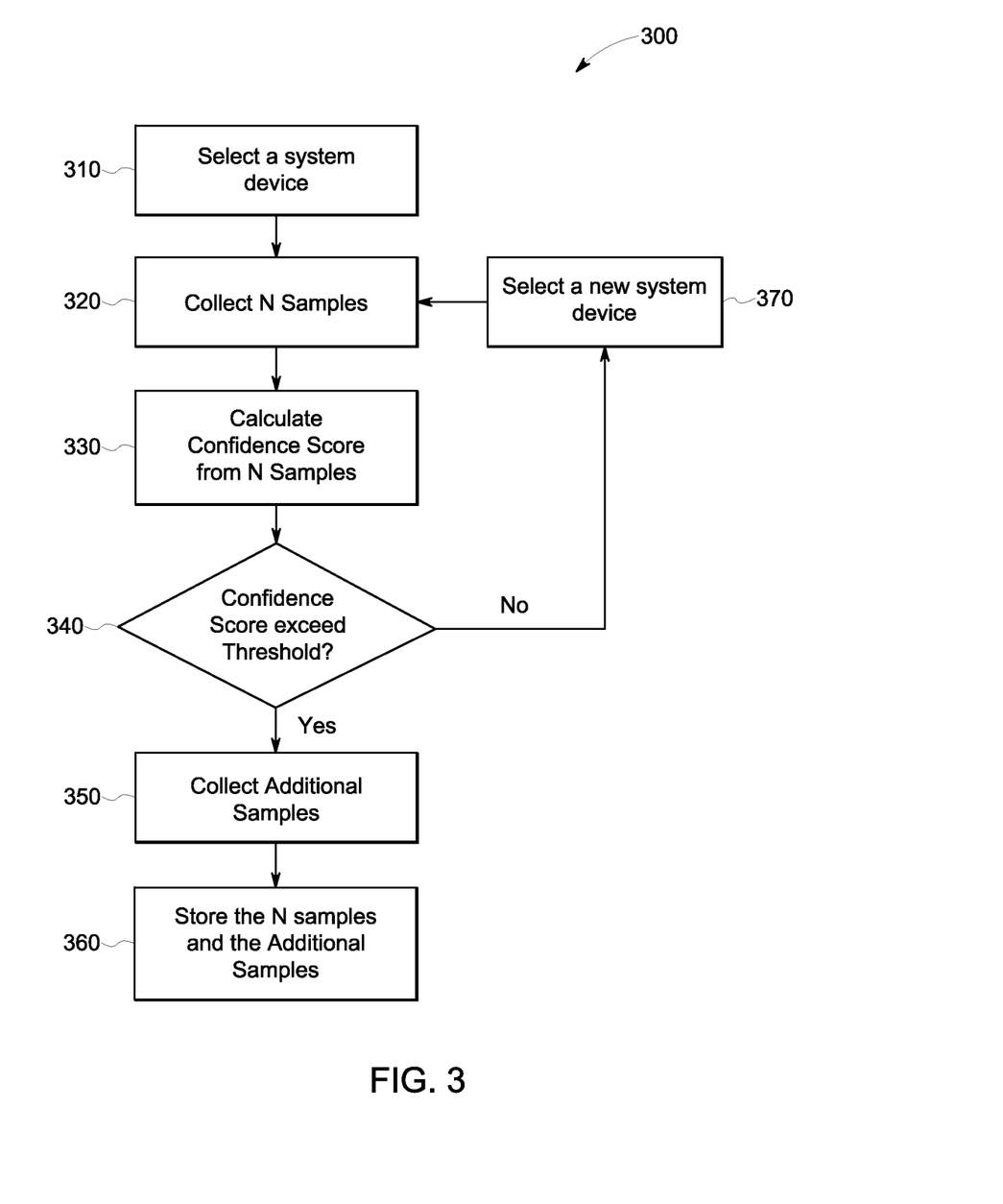
FIG. 3 is a flow chart of an exemplary method for collecting data samples from multiple system devices using the device management computer system shown in FIG. 1.

FIG. 3 is a flow chart of an exemplary method 300 for collecting data samples from multiple system devices. DM computer system 112 (shown in FIG. 1) selects 310 a system device, such as an operable system device 114 (shown in FIG. 1). In the exemplary embodiment, when DM computer system 112 selects a system device, DM computer system 112 connects to the control valve to open communication. DM computer system 112 collects 320 N samples from operable system device 114. The number 'N' represents a number of samples necessary to determine the utility of the data being provided by operable system device 114. DM computer system 112 may collect the samples from the operable system device 114 by requesting each sample or by listening to the operable system device 114 and receiving the sample through the connection. Each sample contains data on at least one characteristic of the selected operable system device 114 at a different point in time. In the exemplary embodiment, the sample contains the set point of the control valve, the actual position of the control valve, and the air pressure of the actuator controlling the control valve. When collecting sample data for statistical analysis from operable system device 114, DM computer system 112 needs to collect a certain number of distinct (D) samples, for example, 120 samples, where each sample is collected at a different point in time. N is a subset of D samples where N is significantly less than D. N is calculated based on the number of distinct samples needed to consistently calculate the utility of the data being collected. The actual size of D can vary based on the device in question and the analysis that will be performed on the sample data. N and D can be set by the user 156 (shown in FIG. 2). In some embodiments, N can be consistent for all of the operable system devices 114. In other embodiments, N can be determined for each device based on the attributes of the device or N can be randomly determined for each device.

DM computer system 112 calculates 330 a confidence score based on the collected N samples. The confidence score represents the calculated utility of the data and the likelihood that if DM computer system 112 continues to collect data from the currently selected operable system device 114, the data collected will be useful for analysis. In the exemplary embodiment, the confidence score is the variance of either the set point of the control valve or the actual position of the control valve. DM computer system 112 compares the confidence score to a predetermined threshold to determine if the confidence score exceeds 340 the predetermined threshold. The predetermined threshold can be set by the user 156 or be calculated by previous analysis to determine when data will have the highest likelihood of utility in analysis. If the confidence score exceeds the predetermined threshold, then the DM computer system 112 collects 350 additional samples from the selected operable system device 114. The number of additional samples collected is the difference between the D samples needed and the N samples already collected, so that DM computer system 112 has collected a total of D samples from the selected operable system device 114. Then DM computer system 112 stores 360 the N samples and the additional samples.

If the confidence score does not exceed the predetermined threshold, DM computer system 112 selects 370 a different operable system device 114 and proceeds to Step 320 to collect N samples from that operable system device. Accordingly, DM computer system 112 does not spend time collecting data that might not be useful for analysis purposes. In some embodiments, DM computer system 112 discards the N samples collected from the original system device. In other embodiments, DM computer system 112 stores the original N samples for historical or archiving purposes.

In some further embodiments, the decision about the usefulness of the data uses a variable number of samples, as opposed to a fixed number N. For example, a sequential probability ratio test (SPRT) makes one of three decisions at any stage: accept, reject, or continue monitoring. The SPRT formulates its decision criterion (i.e., the likelihood ratio) cumulatively as each new sample is collected. In this embodiment, DM computer system 112 decides whether to proceed with each additional sample by looking at the samples already collected as well as the sample that was just collected.

In additional embodiments, the DM computer system 112 uses the set point, the position, and/or the control mechanism of the control valve to determine whether the operable system device is providing useful data. In these embodiments, DM computer system 112 determines whether to proceed to Step 350 when one or more of the characteristics are within a predetermined range. For example, DM computer system 112 decides to proceed to Step 350 to collect additional samples when the set point is between 50 and 80. In further embodiments, the DM computer system determines to proceed to Step 350 when the characteristic is outside of a predetermined range, or when the characteristic is above or below a predetermined threshold.

Figure 4:
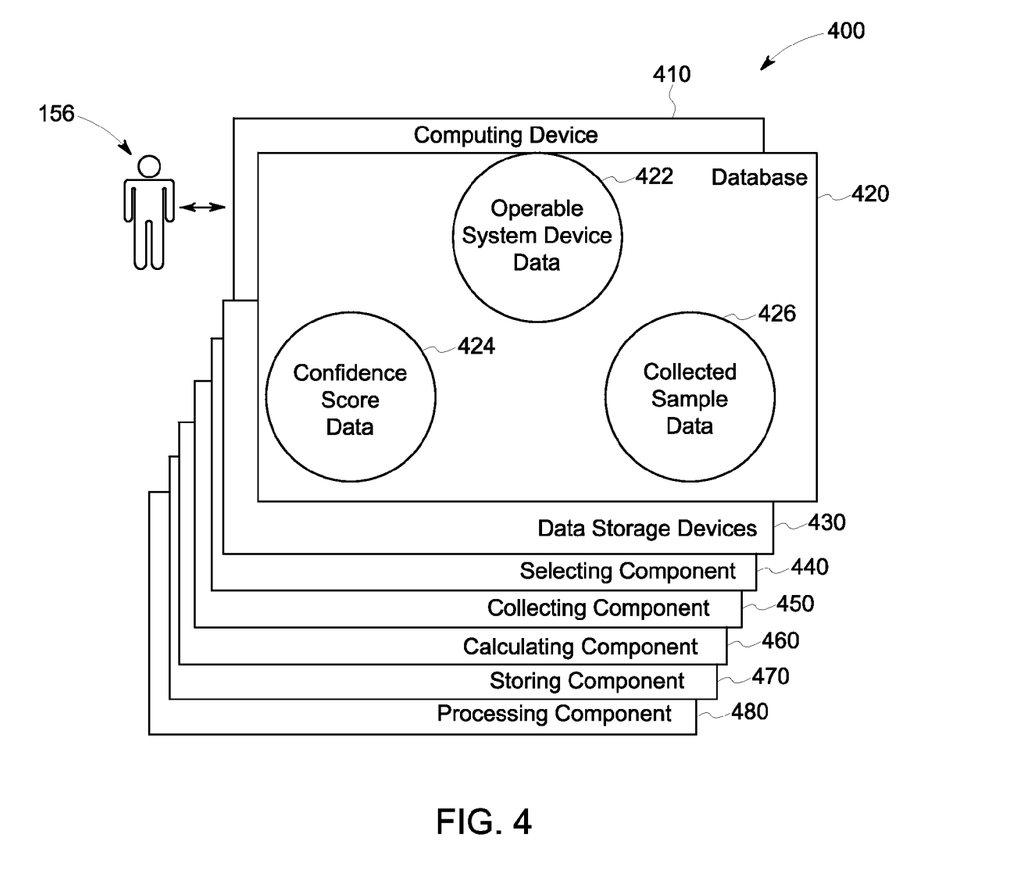
FIG. 4 illustrates an exemplary configuration of a database within a computing device, along with other related computing components, that may be used during analysis and operations on the data streams as described herein.

FIG. 4 illustrates an exemplary configuration 400 of a database 420 within a computing device 410, along with other related computing components, that may be used during analysis and operations on the data streams as described herein. Database 420 is coupled to several separate components within computing device 410, which perform specific tasks. In the exemplary embodiment, computing device 410 is DM computer system 112 (shown in FIG. 1).

In the exemplary embodiment, database 420 includes operable system device data 422, confidence score data 424, and collected sample data 426. Operable system device data 422 includes information associated with operating and/or monitoring operable system devices 114 (shown in FIG. 1). Confidence score data 424 includes information associated with calculating a confidence score as described in method 300 (shown in FIG. 3). Collected sample data 426 includes stored samples from operable system devices that provided potentially useful data.

Computing device 410 includes database 420, as well as data storage devices 430. Computing device 410 also includes a selecting component 440 for selecting operable system devices 114. Computing device 410 further includes a collecting component 450 for collecting sample data from operable system devices 114. A calculating component 460 is also included for calculating a confidence score using confidence score data 424. Moreover, computing device 410 includes a storing component 470 for storing collected samples in collected sample data 426. A processing component 480 assists with execution of computer-executable instructions associated with the processing monitoring system 100.

The above-described systems and methods provide a way to efficiently collect sample data from multiple operating system devices in a distributed control system. What data will be useful can be defined in many different ways, and is dependent on the situation and how the data will be used. In the exemplary embodiment, the data from the control valve may be used to determine how the actual position of the valve differs from the set point of the valve. By comparing these data points and factoring in the air pressure of the actuator at different points, a prediction of the state of the control valve can be determined. This determination can be used to predict when maintenance needs to be performed on the valve or to predict when the valve needs to be replaced due to a high likelihood of failure.

Data collection from operable system devices is traditionally implemented by sampling from each system device in turn for an extended period of time requiring significant time investment for data of potentially minimal utility. The embodiments described herein allow for estimating the utility of the data being received from a system device after a short time before committing to continued sampling. The use of a smaller sample of data to determine utility allows for the circumvention of the time intensive step of receiving data for an extended period in situations where the system device is not producing useful data, perhaps because it is inactive or in a particular operating state that will not yield information useful for diagnostics.

An exemplary technical effect of the methods, systems, and apparatus described herein includes at least one of: (a) quickly determining whether an operable system device is going to provide data that is useful; (b) moving on to the next operable system device if the data was not going to be useful; (c) collecting data from the operable system device if the data was determined to be useful; and (d) not expending time to collect data that is not useful.

Exemplary embodiments of systems and methods for collecting data from multiple operable system devices are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring data collection systems and methods, and are not limited to practice with only the distributed control system for control valves system data collection system and methods as described herein. Rather, the exemplary embodiments can be implemented and utilized in connection with many other data collection applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A process monitoring system, said system comprising:
    a plurality of operable system devices comprising a first operable system device and a second operable system device;
    a processing device coupled to said plurality of operable system devices, wherein the processing device is configured to communicate with only one of the plurality of operable system devices at a time, said processing device configured to:
    select said first operable system device;
    receive a first plurality of data from said first operable system device, wherein the first plurality of data represents at least one characteristic of said first operable system device at a first plurality of points in time;
    calculate a confidence score based on the first plurality of data;
    compare the confidence score to a threshold;
    determine that the confidence score exceeds the threshold based on the comparison, wherein said processing device is configured to receive a second plurality of data from said first operable system device, the second plurality of data represents the at least one characteristic of said first operable system device at a second plurality of points in time, the second plurality of points in time substantially larger than the first plurality of points in time, and wherein said processing device is further configured to select said second operable system device after the second plurality of data has been received over the second plurality of points in time; and
    determine that the confidence score does not exceed a threshold based on the comparison, wherein said processing device is configured to select said second operable system device.

2. The system of claim 1, wherein said processing device is further configured to determine whether the first plurality of data indicates a high likelihood that one of the second plurality of data and a union of the first plurality of data and the second plurality of data will provide useful data for future analysis.

3. The system of claim 1, wherein at least one of said plurality of operable system devices is a control valve.

4. The system of claim 3, wherein the control valve includes a pneumatic positioning device, and the at least one characteristic which includes at least one of a valve position, a valve position set point, and a pressure of the pneumatic positioning device.

5. The system of claim 4, wherein the confidence score is based on the variance of one of the set point and the position based on the first plurality of data.

6. The system of claim 4, wherein said processing device is further configured to determine whether at least one of the position, the set point, and the pressure is within a predetermined range.

7. The system of claim 1, wherein the first plurality of points in time is randomly determined for each operable system device of said plurality of operable system devices.

8. A computer-implemented method for monitoring characteristic data, said method implemented using a processing device in communication with a memory device, wherein said processing device is configured to communicate with only one of a plurality of operable system devices at a time, said method comprising:
    selecting, by the processing device, a first operable system device from the plurality of operable system devices;
    receiving, by the processing device, a first plurality of data from the first operable system device, wherein the first plurality of data represents at least one characteristic of the first operable system device at a first plurality of points in time;
    calculating, by the processing device, a confidence score based on the first plurality of data;
    comparing, by the processing device, the confidence score to a threshold;
    determining that the confidence score exceeds the threshold based on the comparison, wherein the processing device receives a second plurality of data from the first operable system device, the second plurality of data represents the at least one characteristic of the first operable system device at a second plurality of points in time, the second plurality of points in time substantially larger than the first plurality of points in time and selects a second operable system device after the second plurality of data has been received over the second plurality of points in time; and
    determining that the confidence score does not exceed the threshold based on the comparison, wherein the processing device selects the second operable system device from the plurality of operable system devices.

9. The method of claim 8, wherein determining whether the first plurality of data is useful comprises determining whether the first plurality of data indicates a high likelihood that one of the second plurality of data and a union of the first plurality of data and the second plurality of data will provide useful data for future analysis.

10. The method of claim 8, wherein at least one of the plurality of operable system devices is a control valve.

11. The method of claim 10, the control valve includes a pneumatic positioning device, and the at least one characteristic which includes at least one of a valve position, a valve position set point, and a pressure of the pneumatic positioning device.

12. The method of claim 11, wherein the confidence score is based on a variance of one of the set point and the position based on the first plurality of data.

13. The method of claim 11, wherein determining whether the first plurality of data is useful comprises determining whether at least one of the position, the set point, and the pressure is within a predetermined range.

14. The method of claim 8 further comprising randomly determining, by the processing device, the first plurality of points in time for the first operable system device.

15. A non-transitory computer-readable storage media having computer-executable instructions embodied thereon, wherein, when executed by at least one processor, the computer-executable instructions cause the at least one processor to:
communicate with only one of a plurality of operable system devices at a time;
select a first operable system device from the plurality of operable system devices;
receive a first plurality of data from the first operable system device, wherein the first plurality of data represents at least one characteristic of the first operable system device at a first plurality of points in time;
calculate a confidence score based on the first plurality of data;
compare the confidence score to a threshold;
determine that the confidence score exceeds the threshold based on the comparison, wherein the at least one processor receives a second plurality of data from the first operable system device, the second plurality of data represents the at least one characteristic of the first operable system device at a second plurality of points in time, the second plurality of points in time substantially larger than the first plurality of points in time and selects a second operable system device after the second plurality of data has been received over the second plurality of points in time; and
determine that the confidence score does not exceed the threshold based on the comparison, wherein the at least one processor selects the second operable system device from the plurality of operable system devices.

16. The non-transitory computer-readable storage media of claim 15, wherein to determine whether the first plurality of data is useful the instructions further cause the at least one processor to determine whether the first plurality of data indicates a high likelihood that one of the second plurality of data and a union of the first plurality of data and the second plurality of data will provide useful data for future analysis.

17. The non-transitory computer-readable storage media of claim 15, wherein at least one of the plurality of operable system devices is a control valve.

18. The non-transitory computer-readable storage media of claim 17, the control valve includes a pneumatic positioning device, and the at least one characteristic which includes at least one of a valve position, a valve position set point, and a pressure of the pneumatic positioning device.

19. The non-transitory computer-readable storage media of claim 18, wherein the confidence score is based on a variance of one of the set point and the position based on the first plurality of data.

20. The non-transitory computer-readable storage media of claim 18, wherein to determine whether the first plurality of data is useful the instructions further cause the at least one processor to determine whether at least one of the position, the set point and the pressure is within a predetermined range.

21. The non-transitory computer-readable storage media of claim 15, where the instructions further cause the at least one processor to randomly determined for each operable system device of the plurality of operable system devices.

* * * * *